United States Patent
Kim

(10) Patent No.: US 12,525,063 B2
(45) Date of Patent: Jan. 13, 2026

(54) METHOD FOR VERIFYING LIVENESS, AND SERVER USING THE SAME

(71) Applicant: OPENIT INC., Seoul (KR)

(72) Inventor: Min Young Kim, Seoul (KR)

(73) Assignee: OPENIT INC., Seoul (KR)

( * ) Notice: Subject to any disclaimer, the term of this patent is extended or adjusted under 35 U.S.C. 154(b) by 576 days.

(21) Appl. No.: 17/899,134

(22) Filed: Aug. 30, 2022

(65) Prior Publication Data

US 2023/0108664 A1    Apr. 6, 2023

(30) Foreign Application Priority Data

Oct. 6, 2021    (KR) .......... 10-2021-0132347

(51) Int. Cl.
| G06V 40/40 | (2022.01) |
| G06F 21/32 | (2013.01) |
| G06V 40/60 | (2022.01) |
| G08B 7/06  | (2006.01) |

(52) U.S. Cl.
CPC .............. *G06V 40/40* (2022.01); *G06F 21/32* (2013.01); *G06V 40/60* (2022.01); *G08B 7/06* (2013.01)

(58) Field of Classification Search
CPC ........ G06V 40/40; G06V 40/60; G06F 21/32; G06F 21/45; G06F 21/6245; G08B 7/06; A61B 5/1171; H04L 63/0861
See application file for complete search history.

(56) References Cited

U.S. PATENT DOCUMENTS

| 8,925,058 B1* | 12/2014 | Dotan ................ H04L 63/0861 |
| | | 726/1 |
| 2002/0136435 A1* | 9/2002 | Prokoski ............... G06V 40/45 |
| | | 382/118 |
| 2013/0103951 A1* | 4/2013 | Klevan ................... G06F 21/34 |
| | | 713/186 |
| 2013/0212655 A1* | 8/2013 | Hoyos ................... G06V 40/45 |
| | | 726/5 |
| 2018/0075300 A1* | 3/2018 | Mai ....................... G06V 40/10 |

FOREIGN PATENT DOCUMENTS

| KR | 10-2014-0122295 A | 10/2014 |
| KR | 10-2018-0017056 A | 2/2018 |
| KR | 10-2018-0109664 A | 10/2018 |

OTHER PUBLICATIONS

Office Action issued Dec. 5, 2022 in Korean Application No. 10-2021-0132347.

* cited by examiner

*Primary Examiner* — Rufus C Point
(74) *Attorney, Agent, or Firm* — Sughrue Mion, PLLC

(57) ABSTRACT

Provided are a liveness verification method, the method comprises collecting identification information of a verification target, determining whether there is pre-stored non-identifying personal data corresponding to the collected identification information of the verification target, and performing liveness verification on biometric information collected from the verification target using different types of data according to whether there is the pre-stored non-identifying personal data.

13 Claims, 4 Drawing Sheets

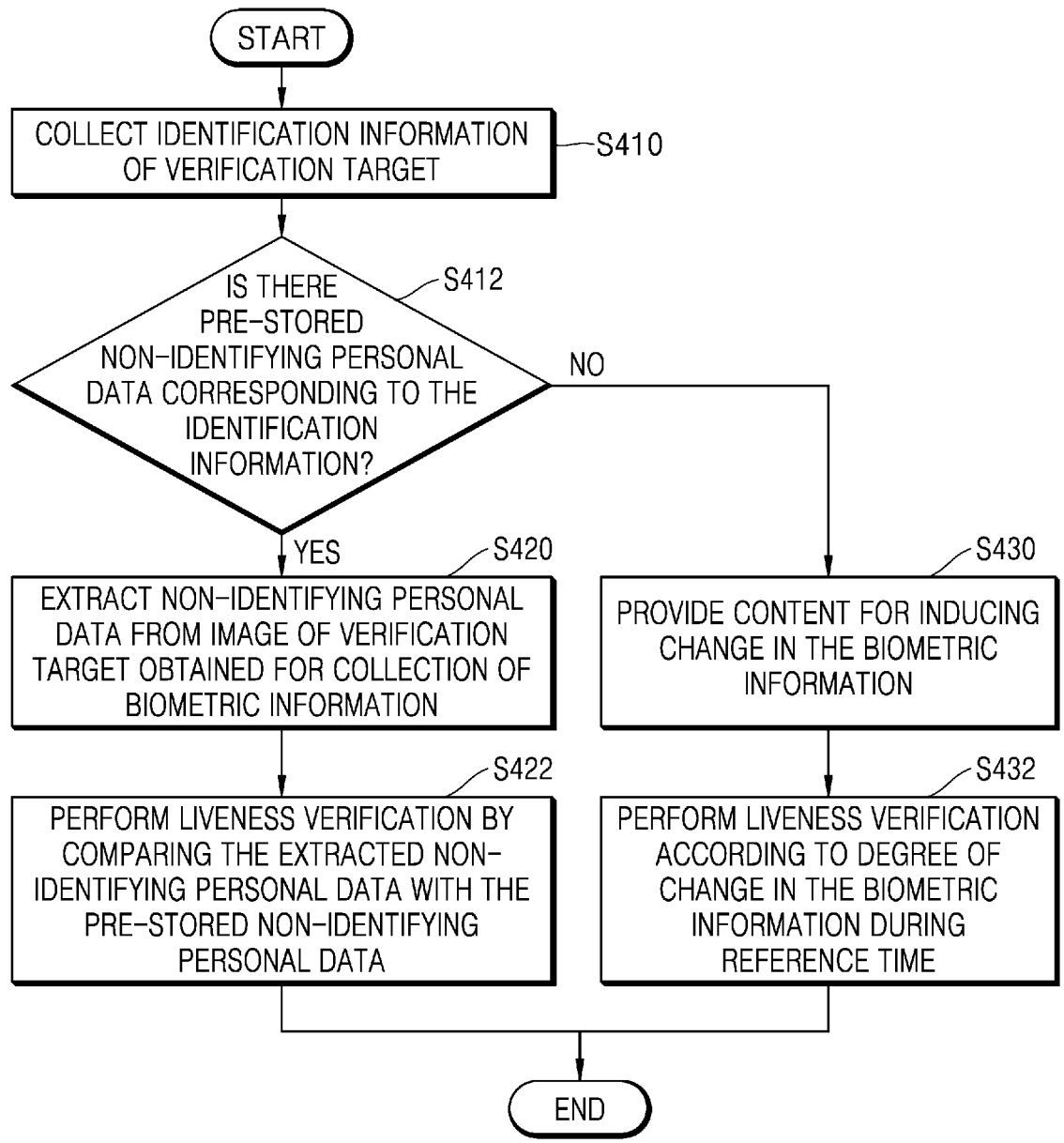

METHOD FOR VERIFYING LIVENESS, AND SERVER USING THE SAME

CROSS-REFERENCE TO RELATED APPLICATIONS

This application claims the benefits of Korean Patent Applications No. 10-2021-0132347, filed on Oct. 6, 2021, in the Korean Intellectual Property Office, the disclosures of which are incorporated herein in their entireties by reference.

BACKGROUND

1. Field

The present disclosure relates to a liveness verification method, and a server using the same, and more particularly, to a liveness verification method capable of performing liveness verification on biometric information collected from a verification target using different types of data according to whether there is pre-stored non-identifying personal data corresponding to identification information of the verification target, and a server using the same.

2. Description of the Related Art

Biometric authentication is a technology that verifies the identity of a person using physical or behavioral characteristics and grants the person access to devices, services, or spaces with restricted access rights. Biometric data such as fingerprint, face, or voice is mainly used for biometric authentication and a characteristic or pattern unique to each person in the biometric data is utilized for biometric authentication.

However, in biometric authentication, spoofing using forged fingerprints and forged faces exists, and in order to prevent spoofing, a liveness verification technology that checks whether an object providing biometric authentication information is a living object is required.

SUMMARY

Provided are a liveness verification method capable of performing liveness verification on biometric information collected from a verification target using different types of data according to whether there is pre-stored non-identifying personal data corresponding to identification information of the verification target, and a server using the same.

Additional aspects will be set forth in part in the description which follows and, in part, will be apparent from the description, or may be learned by practice of the presented embodiments.

According to an aspect of an embodiment, a liveness verification method may comprises collecting identification information of a verification target, determining whether there is pre-stored non-identifying personal data corresponding to the collected identification information of the verification target and performing liveness verification on biometric information collected from the verification target using different types of data according to whether there is the pre-stored non-identifying personal data.

According to an aspect of an embodiment, the identification information may be the biometric information of the verification target, personal information of the verification target, or a unique identification information of a terminal device possessed by the verification target.

According to an aspect of an embodiment, when the identification information is the biometric information of the verification target, liveness verification on the biometric information may be performed after an authentication process for the biometric information is first performed, and when the identification information is not the biometric information of the verification target, an authentication process for the biometric information may be performed after liveness verification on the biometric information is first performed.

According to an aspect of an embodiment, the non-identifying personal data may be data that cannot directly identify the verification target, but indicates personal characteristics of the verification target.

According to an aspect of an embodiment, the non-identifying personal data may comprise at least one of the type of clothes, the color of clothes, the hairstyle, the beard shape, the type of accessories being worn, and whether or not glasses are worn of the verification target.

According to an aspect of an embodiment, the performing of the liveness verification may comprise performing, when there is the pre-stored non-identifying personal data, liveness verification on the biometric information collected from the verification target using the pre-stored non-identifying personal data.

According to an aspect of an embodiment, the performing of the liveness verification may comprise extracting non-identifying personal data from an image of the verification target obtained for collection of the biometric information and performing liveness verification on the biometric information collected from the verification target according to a comparison result of the extracted non-identifying personal data and the pre-stored non-identifying personal data.

According to an aspect of an embodiment, the performing of the liveness verification may comprise determining that the liveness verification is successful when similarity is less than a first reference value according to the comparison result of the extracted non-identifying personal data and the pre-stored non-identifying personal data.

According to an aspect of an embodiment, when several types of non-identifying personal data are used together for the liveness verification, the first reference value may be set differently for each type of non-identifying personal data.

According to an aspect of an embodiment, when liveness verification is successful by performing liveness verification on the biometric information collected from the verification target using the pre-stored non-identifying personal data, the extracted non-identifying personal data may be also used in a user authentication process using the biometric information to be performed later.

According to an aspect of an embodiment, in the user authentication process, when similarity between the biometric information and pre-stored biometric information is greater than a second reference value, and similarity between the extracted non-identifying personal data and the pre-stored non-identifying personal data is less than a third reference value, it may be determined that the user authentication is successful.

According to an aspect of an embodiment, the performing of the liveness verification may comprise performing liveness verification according to a degree of change in biometric information collected from the verification target during a reference time when there is no pre-stored non-identifying personal data.

According to an aspect of an embodiment, the performing of the liveness verification may comprise providing visual content, auditory content, or tactile content for inducing a change in biometric information of the verification target.

According to an aspect of an embodiment, a liveness verification server which includes at least one processor and a memory, may comprise a liveness verification type selector configured to determine whether there is pre-stored non-identifying personal data corresponding to collected identification information of a verification target, and select a liveness verification type according to whether there is the pre-stored non-identifying personal data and a liveness verifier configured to perform liveness verification on biometric information collected from the verification target using different types of data according to the selected liveness validation verification type.

BRIEF DESCRIPTION OF THE DRAWINGS

These and/or other aspects will become apparent and more readily appreciated from the following description of the embodiments, taken in conjunction with the accompanying drawings in which:

FIG. 4 is a flowchart of a liveness verification method according to an embodiment.

DETAILED DESCRIPTION

Figure 1:
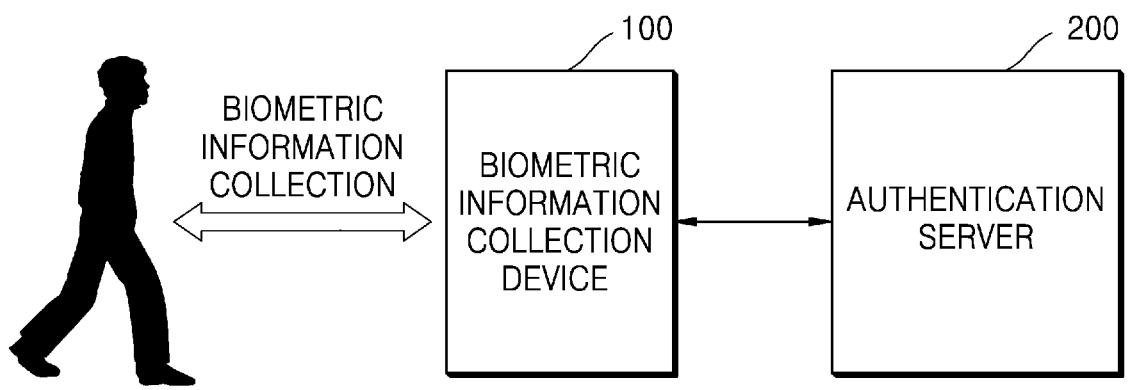
FIG. 1 is a conceptual diagram of a biometric authentication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a biometric authentication system according to an embodiment.

Referring to FIG. 1, a biometric authentication system 10 according to an embodiment may include a biometric information collection device 100 and an authentication server 200.

The biometric information collection device 100 may collect biometric information from an authentication target (or verification target).

According to an embodiment, the biometric information that may be collected by the biometric information collection device 100 may include various information such as a face, an iris, a retina, a voice, a fingerprint, a hand shape, a vein, or a handwriting.

The biometric information collection device 100 may include a camera or various sensors for obtaining biometric information from an authentication target (or verification target).

The biometric information collection device 100 may process (e.g., encrypt) the collected biometric information and transmit the same to the authentication server 200.

The authentication server 200 may authenticate the biometric information that is processed by the biometric information collection device 100 and transmitted from the biometric information collection device 100.

In addition, the authentication server 200 may also perform liveness verification on the authentication target (or verification target) who has provided the biometric information.

In this specification, the term "authentication server" may have the same meaning as that of the term "liveness verification server".

The biometric information collection device 100 may receive an authentication result and a liveness verification result of the authentication server 200 and grant access to a specific device, service, or space of the authentication target (or verification target).

Detailed structures and operations of the biometric information collection device 100 and the authentication server 200 will be described later with reference to FIGS. 2 to 4.

Figure 2:
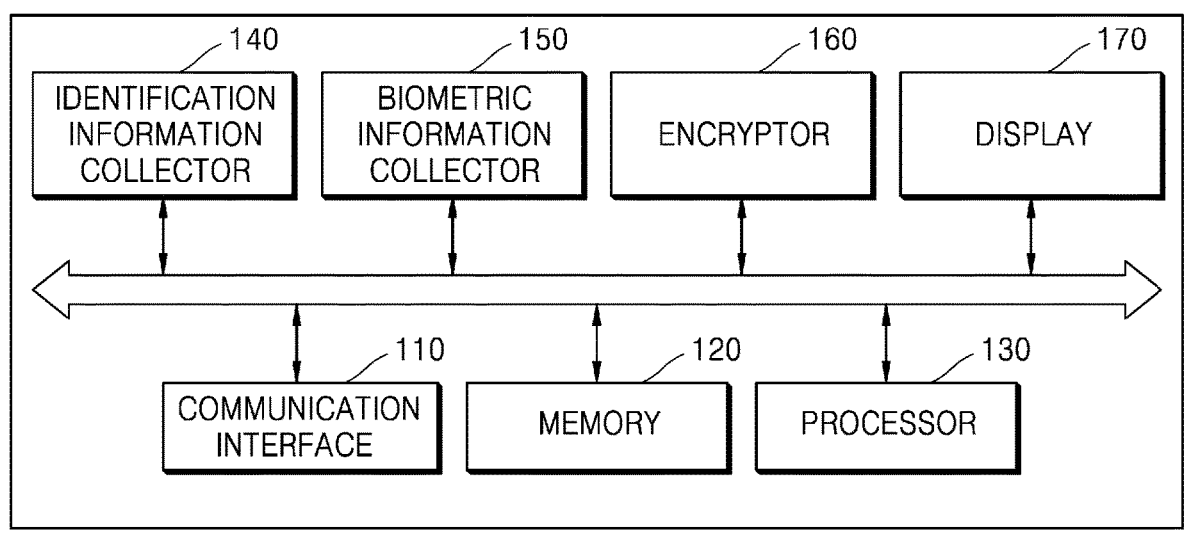
FIG. 2 is a block diagram of a biometric information collection device shown in FIG. 1, according to an embodiment.

FIG. 2 is a block diagram of a biometric information collection device shown in FIG. 1, according to an embodiment.

Referring to FIGS. 1 and 2, the biometric information collection device 100 may include a communication interface 110, a memory 120, a processor 130, an identification information collector 140, a biometric information collector 150, an encryptor 160, and a display 170.

The communication interface 110 may interface communication between the authentication server 200 and the biometric information collection device 100, and may process data or signals transmitted and received during the interfacing process.

The memory 120 may temporarily or permanently store data required in processing of the processor 130, data generated during or after the processing of the processor 130, or data collected by the biometric information collector 150.

The processor 130 may perform all operations and data processing in the biometric information collection device 100.

According to an embodiment, the processor 130 may include the encryptor 160 in the form of a module.

The identification information collector 140 may collect identification information of the authentication target (or verification target) from the authentication target (or verification target).

According to an embodiment, the identification information may be biometric information of the authentication target (or verification target), personal information (e.g., name, age, date of birth, contact information, address, etc.) of the authentication target (or verification target), or a unique identification information (e.g., a media access control (MAC) Address), international mobile equipment identity (IMEI), etc.) of a terminal device possessed by the authentication target (or verification target).

The biometric information collector 150 may collect biometric information, such as a face, iris, retina, voice, fingerprint, hand shape, vein, or handwriting, from the authentication target (or verification target).

According to an embodiment, the biometric information collector 150 may include a camera or various sensors for obtaining biometric information.

The encryptor 160 may encrypt the biometric information collected by the biometric information collector 150 and manage the encrypted biometric information.

According to an embodiment, the encryptor 160 may encrypt biometric information in various methods such as a public key cryptography method (e.g., Fast Identity Online (FIDO) standard), and the technical scope of the disclosure is not limited by the encryption method of the encryptor 160.

The display 170 may display visual content for inducing a change in biometric information when collecting biometric information from the authentication target (or verification target). According to an embodiment, a change in biometric information of the authentication target (or verification target) may be used for liveness verification.

According to an embodiment, in addition to the display 170, the biometric information collection device 100 may further include a device for providing audible content or tactile content for inducing a change in biometric information of the authentication target (or verification target).

For example, the biometric information collection device 100 may further include a speaker (not shown), and may output a guide message or sound for inducing a change in the biometric information through the speaker.

For example, when the biometric information collector 150 collects fingerprint data of the authentication target (or verification target), the biometric information collection device 100 may make a tactile change in a part touched by the finger of the authentication target (or verification target) in order to forcibly move the finger of the authentication target (or verification target) (e.g., protrusion of small protrusions, etc.).

The biometric information collection device 100 may transmit identification information and biometric information (or data that includes both biometric information and non-identifying personal data) collected from the authentication target (or verification target) to the authentication server 200 through the communication interface 110.

As used herein, the term "non-identifying personal data" may refer to data that cannot directly identify an authentication target (or verification target), but indicates personal characteristics of the authentication target (or verification target).

According to an embodiment, the non-identifying personal data may include at least one of the type of clothes, the color of clothes, the hairstyle, the beard shape, the type of accessories being worn, and whether or not glasses are worn of the authentication target (or verification target).

Figure 3:
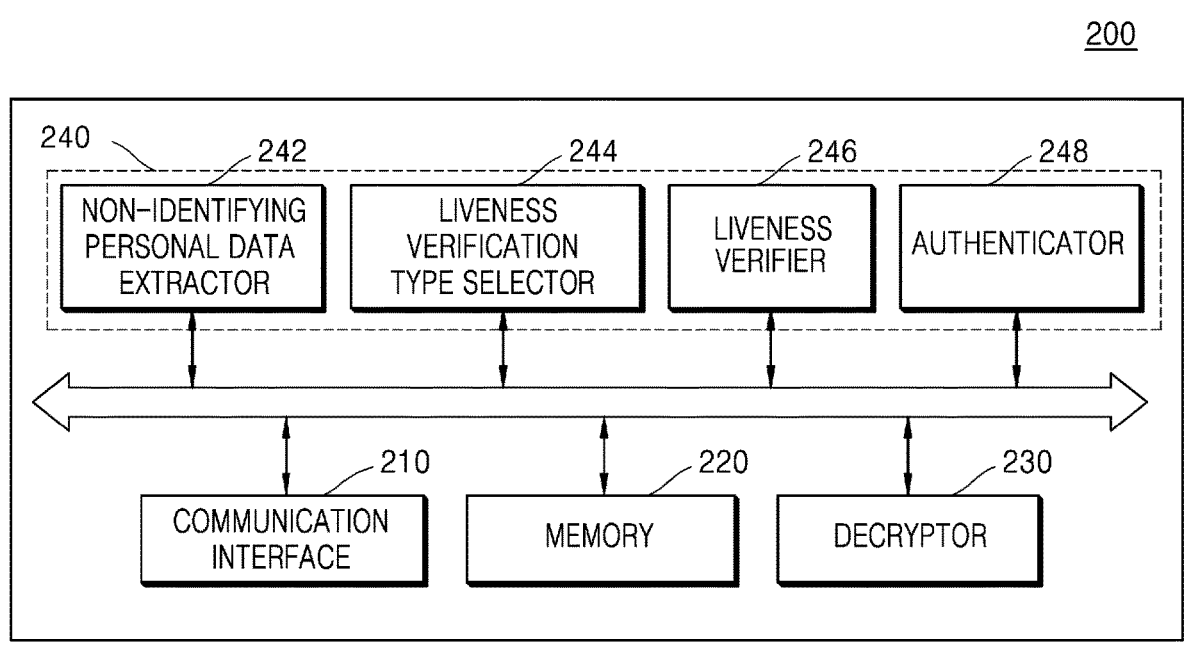
FIG. 3 is a block diagram of an authentication server shown in FIG. 1, according to an embodiment.

FIG. 3 is a block diagram of the authentication server shown in FIG. 1, according to an embodiment.

Referring to FIGS. 1 to 3, the authentication server 200 may include a communication interface 210, a memory 220, a decryptor 230, and a processor 240.

The authentication server 200 may perform user authentication using biometric information transmitted from the biometric information collection device 100, and may perform liveness verification on the corresponding biometric information using non-identifying personal data extracted from an image including the biometric information.

The communication interface 210 may interface communication between the authentication server 200 and the biometric information collection device 100, and may process data or signals transmitted and received during the interfacing process.

The memory 220 may store data required for user authentication of an authentication target (or verification target) or liveness verification on the authentication target (or verification target), data required for the processing of the processor 230, and data generated during or after the processing of the processor 230.

The decryptor 230 may decrypt biometric information encrypted and transmitted by the biometric information collection device 100 or data (e.g., image data) including the biometric information and non-identifying personal data.

The processor 240 may include a non-identifying personal data extractor 242, a liveness verification type selector 244, a liveness verifier 246, and an authenticator 248.

The non-identifying personal data extractor 242 may extract non-identifying personal data from data decrypted by the decryptor 230.

According to an embodiment, the non-identifying personal data extractor 242 may extract non-identifying personal data from the remaining areas except for an area used for authenticating the authentication target (or verification target) by the authenticator 248.

According to another embodiment, the non-identifying personal data extractor 242 may extract non-identifying personal data by removing a portion that allows a specific person to be directly identified from within an area used for authenticating the authentication target (or verification target) by the authenticator 248 or by processing a special effect (e.g., blur, mosaic processing, etc.) on the portion that allows a specific person to be directly identified.

The liveness verification type selector 244 may determine whether there is pre-stored non-identifying personal data in the memory 220 corresponding to identification information of the authentication target (or verification target), and may select a liveness verification type according to whether there is pre-stored non-identifying personal data in the memory 220.

The liveness verifier 246 may perform liveness verification using different types of data (e.g., non-identifying personal data or biometric information data) according to the liveness verification type selected by the liveness verification type selector 244.

According to an embodiment, when there is pre-stored non-identifying personal data in the memory 220, the liveness verification type selector 244 may perform liveness verification using the pre-stored non-identifying personal data. in this case, the liveness verifier 246 may compare non-identifying personal data extracted from the non-identifying personal data extractor 242 with pre-stored non-identifying personal data corresponding to identification information of the authentication target (or verification target), and may determine that the liveness verification is successful when the similarity is less than a first reference value according to a result of the comparing. According to an embodiment, various types of non-identifying personal data may be used together in a liveness verification process of the liveness verifier 246. In this case, the first reference value used for determining the similarity in the liveness verification may be set differently for each type of non-identifying personal data. For example, from among the non-identifying personal data, a first reference value related to a hairstyle may be set less than a first reference value related to a beard shape.

According to another embodiment, when there is no pre-stored non-identifying personal data in the memory 220, the liveness verification type selector 244 may perform liveness verification according to the degree of change in biometric information collected from the authentication target (or verification target) during a reference time. According to an embodiment, when providing content that induces changes in biometric information on the display 170 of the biometric information collection device 100, etc., the liveness verification type selector 244 may perform liveness verification according to the degree of change in biometric information collected from the authentication target (or verification target) during a reference time from the time the corresponding content is provided.

The authenticator 248 may perform user authentication according to the similarity between biometric information of the authentication target (or verification target) decrypted by the decryptor 230 and pre-stored biometric information.

The authentication server 200 may determine that authentication is finally performed when liveness verification is successful by the liveness verifier 246 and authentication is successful by the authenticator 248.

According to an embodiment, when liveness verification is performed using pre-stored non-identifying personal data and the liveness verification is successful, the authenticator 248 may also use non-identifying personal data extracted by the non-identifying personal data extractor 242 in a user authentication process using biometric information. in this case, the authenticator 248 may determine that user authentication is successful when the similarity between biometric information and pre-stored biometric information is greater than a second reference value, and the similarity between extracted non-identifying personal data and pre-stored non-identifying personal data is less than a third reference value.

FIG. 4 is a flowchart of a liveness verification method according to an embodiment.

Referring to FIGS. 1 to 4, in operation S410, the liveness verification method according to an embodiment may collect identification information of a verification target.

According to an embodiment, the identification information may be biometric information of an authentication target (or verification target), personal information (e.g., name, age, date of birth, contact information, address, etc.) of the authentication target (or verification target), or a unique identification information (e.g., an MAC Address, IMEI, etc.) of a terminal device possessed by the authentication target (or verification target).

According to an embodiment, when the identification information is the biometric information of the authentication target (or verification target), liveness verification on the biometric information may be performed after an authentication process for the biometric information is first performed.

According to another embodiment, when the identification information is not the biometric information of the authentication target (or verification target) (e.g., personal information or unique identification information of a terminal device, etc.), an authentication process for the biometric information may be performed after liveness verification on the biometric information is first performed.

In operation S412, the liveness verification method according to an embodiment may determine whether there is pre-stored non-identifying personal data corresponding to the identification information collected in operation S410.

According to an embodiment, the non-identifying personal data may include at least one of the type of clothes, the color of clothes, the hairstyle, the beard shape, the type of accessories being worn, and whether or not glasses are worn of the authentication target (or verification target).

When there is pre-stored non-identifying personal data according to a result of the determining in operation S412, in operation S420, the liveness verification method according to an embodiment may extract non-identifying personal data from an image of the verification target obtained for the collection of biometric information.

According to an embodiment, in operation S420, in the image, non-identifying personal data may be extracted from the remaining areas except for an area used for authenticating the authentication target (or verification target).

According to another embodiment, in operation S420, the non-identifying personal data may be extracted by removing a portion that allows a specific person to be directly identified from within an area used for authenticating the authentication target (or verification target) or by processing a special effect on the portion that allows a specific person to be directly identified.

In operation S422, the liveness verification method according to an embodiment may perform liveness verification by comparing the non-identifying personal data extracted in operation S420 with pre-stored non-identifying personal data.

According to an embodiment, the non-identifying personal data extracted in operation S420 is compared with the pre-stored non-identifying personal data, and when the similarity is less than a first reference value according to a result of the comparing, it can be determined that liveness verification is successful.

When the liveness verification is successful in operation S422, the non-identifying personal data extracted in operation S420 may also be used in a user authentication process using biometric information. In this case, it may be determined that user authentication is successful when the similarity between biometric information and pre-stored biometric information is greater than a second reference value, and the similarity between extracted non-identifying personal data and pre-stored non-identifying personal data is less than a third reference value.

When there is no pre-stored non-identifying personal data according to the determination result in operation S412, in operation S430, the liveness verification method according to an embodiment may provide content for inducing a change in biometric information to be used for authenticating the authentication target (or verification target).

According to an embodiment, content for inducing a change in biometric information may be visual content, auditory content, or tactile content.

In operation S432, the liveness verification method may perform liveness verification according to the degree of change in biometric information during a reference time.

According to an embodiment, when the degree of change in the biometric information during the reference time in operation S432 is greater than a fourth reference value, it may be determined that liveness verification is successful.

According to an embodiment, in operation S432, liveness verification may be performed according to the degree of change in biometric information collected from the authentication target (or verification target) for a reference time from a point in time when the content for inducing a change in biometric information is provided in operation S430.

According to an embodiment, the liveness verification method according to an embodiment may be implemented as a program including program code for performing operations S410 to S432 and stored in a medium, and a processor may be combined with the medium to execute the program.

Methods and devices according to an embodiment may store non-identifying personal data with few restrictions on storage, and may perform liveness verification at a high speed using pre-stored non-identifying personal data without the need to collect biometric information for a certain period of time for liveness verification when there is pre-stored non-identifying personal data corresponding to identification information of a verification target.

Methods and devices according to an embodiment may selectively use biometric information for liveness verification when there is no pre-stored non-identifying personal data corresponding to identification information of a verification target.

In particular, when biometric information is used for liveness verification, methods and devices according to an embodiment may actively induce changes in biometric information and perform fast and accurate liveness verification using the induced changes in biometric information.

Hereinabove, the present invention has been described with reference to the preferred embodiments. However, it will be appreciated by one of ordinary skill in the art that various modifications and changes of the present invention can be made without departing from the scope of the inventive concept which are defined in the appended claims and their equivalents.

What is claimed is:

1. A liveness verification method comprising:
collecting identification information of a verification target;
determining whether there is pre-stored non-identifying personal data corresponding to the collected identification information of the verification target; and
performing liveness verification on biometric information collected from the verification target using different types of data selectively according to whether there is the pre-stored non-identifying personal data,
wherein the performing of the liveness verification comprises:
performing, when there is the pre-stored non-identifying personal data, liveness verification on the biometric information collected from the verification target using the pre-stored non-identifying personal data; and
performing, when there is no pre-stored non-identifying personal data, liveness verification on the biometric information collected from the verification target using the biometric information.

2. The liveness verification method of claim 1, wherein the identification information is the biometric information of the verification target, personal information of the verification target, or a unique identification information of a terminal device possessed by the verification target.

3. The liveness verification method of claim 2, wherein, when the identification information is the biometric information of the verification target, liveness verification on the biometric information is performed after an authentication process for the biometric information is first performed, and
when the identification information is not the biometric information of the verification target, the authentication process for the biometric information is performed after liveness verification on the biometric information is first performed.

4. The liveness verification method of claim 1, wherein the non-identifying personal data is data that cannot directly identify the verification target, but indicates personal characteristics of the verification target.

5. The liveness verification method of claim 4, wherein the non-identifying personal data comprises at least one of a type of clothes, a color of clothes, a hairstyle, a beard shape, a type of accessories being worn, and whether or not glasses are worn of the verification target.

6. The liveness verification method of claim 1, wherein the performing of the liveness verification comprises:
extracting non-identifying personal data from an image of the verification target obtained for collection of the biometric information; and
performing liveness verification on the biometric information collected from the verification target according to a comparison result of the extracted non-identifying personal data and the pre-stored non-identifying personal data.

7. The liveness verification method of claim 6, wherein the performing of the liveness verification comprises:
determining that the liveness verification is successful when similarity is less than a first reference value according to the comparison result of the extracted non-identifying personal data and the pre-stored non-identifying personal data.

8. The liveness verification method of claim 7, wherein, when several types of non-identifying personal data are used together for the liveness verification, the first reference value is set differently for each type of non-identifying personal data.

9. The liveness verification method of claim 7, wherein, when liveness verification is successful by performing liveness verification on the biometric information collected from the verification target using the pre-stored non-identifying personal data, the extracted non-identifying personal data is also used in a user authentication process using the biometric information to be performed later.

10. The liveness verification method of claim 9, wherein, in the user authentication process, when similarity between the biometric information and pre-stored biometric information is greater than a second reference value, and similarity between the extracted non-identifying personal data and the pre-stored non-identifying personal data is less than a third reference value, it is determined that the user authentication is successful.

11. The liveness verification method of claim 1, wherein the performing of the liveness verification comprises:

performing liveness verification according to a degree of change in biometric information collected from the verification target during a reference time when there is no pre-stored non-identifying personal data.

12. The liveness verification method of claim 11, wherein the performing of the liveness verification comprises:

providing visual content, auditory content, or tactile content for inducing a change in biometric information of the verification target.

13. A liveness verification server which includes at least one processor and a memory, the at least one processor being configured to:

determine whether there is pre-stored non-identifying personal data corresponding to collected identification information of a verification target, and select a liveness verification type according to whether there is the pre-stored non-identifying personal data; and perform liveness verification on biometric information collected from the verification target using different types of data selectively according to the selected liveness verification type, wherein the at least one processor is further configured to:

perform, when there is the pre-stored non-identifying personal data, liveness verification on the biometric information collected from the verification target using the pre-stored non-identifying personal data; and perform, when there is no pre-stored non-identifying personal data, liveness verification on the biometric information collected from the verification target using the biometric information.

\* \* \* \* \*